United States Patent [19]

Wong

[11] Patent Number: 4,687,550
[45] Date of Patent: Aug. 18, 1987

[54] WATER DISTILLER

[76] Inventor: Man J. Wong, 61 Rand Street, Hamilton, Ontario L8J 1A5, Canada

[21] Appl. No.: 745,860

[22] Filed: Jun. 17, 1985

[30] Foreign Application Priority Data

Dec. 19, 1984 [CA] Canada .................................. 470477

[51] Int. Cl.$^4$ ............................ B01D 3/02; C02F 1/04
[52] U.S. Cl. .................................... 202/165; 202/180;
202/181; 202/185.3; 202/185.4; 202/196;
202/197; 202/202; 202/206; 202/234; 202/266;
202/185 B; 202/185 C; 126/382; 203/1; 203/2;
203/10
[58] Field of Search .................. 202/185.4, 185.3, 180,
202/202, 206, 195, 196, 181, 266, 83, 197, 234,
165; 203/10, 11, 4, 40, 1, 2, 22, DIG. 1, 100,
DIG. 22, DIG. 17, DIG. 2, 86; 126/382

[56] References Cited

U.S. PATENT DOCUMENTS

| | | | |
|---|---|---|---|
| 587,162 | 7/1897 | Rosebrook | 202/185.4 |
| 633,851 | 9/1899 | Kemp | 202/180 |
| 698,958 | 4/1902 | Jester | 202/185.3 |
| 806,450 | 12/1905 | Barnstead | 202/185.4 |
| 911,467 | 5/1909 | Blunden | 202/185.4 |
| 1,346,537 | 7/1920 | Flowers | 202/185.3 |
| 1,544,383 | 6/1925 | Epprecht | 202/185.4 |
| 4,156,631 | 5/1979 | Andrei | 202/185.4 |
| 4,209,363 | 6/1980 | Ramer | 202/180 |
| 4,239,601 | 12/1980 | Lemoine | 202/185.4 |
| 4,339,307 | 7/1982 | Ellis | 202/185.4 |

Primary Examiner—Wilbur Bascomb

[57] ABSTRACT

A water distiller assembly which provides for an efficient distillation process wherein steam generated in a boiling chamber is delivered to a steam condensing chamber where steam condensation is carried out by the combined effect of water cooling and air cooling. The resulting distilled water is stored in the steam condensing chamber where it is kept hot by the incoming steam for hot serving while at the same time helps in condensing the steam it comes into contact with. Water vapor emanating from the surface of the hot coolant water is also condensed and collected. Operating temperature of the coolant water may be adjusted to suit room temperature demands. The distillation process is made automatic, continuous and self-limiting by the use of two simple float controls and a thermostatic water outlet valve. The essential components comprise a cooling tank with its bottom half immersed in the space contained by a condensing chamber; a heating element and a boiling chamber resting on a bracket support such that feed water is supplied from the cooling tank to the boiling chamber via a connecting conduit and such that the respective water levels in the cooling tank and boiling chamber are maintained at the same level; a cover and a water collecting trough on top of the cooling tank serve to collect extra distilled water and the water is drained to the condensing chamber via a vertical conduit.

25 Claims, 4 Drawing Figures

WATER DISTILLER

BACKGROUND OF THE INVENTION

This invention relates to new and useful improvements in steam condensing units, particularly distilling units designed for home use, where efficient use of energy is paramount in terms of both maximizing benefit from energy expended and minimizing cost.

Most existing water distilling devices consist of boiling water in a boiling chamber where water is turned into steam. The steam, rid of most dissolved impurities found in supply water, is channelled to heat exchangers of various forms where steam is cooled and condensed. The cooling medium may either be a supply of cold water or an air current powered by an electric fan or simply air-cooled. The distilled water thus condensed is collected and led to storage containers where the water is normally available as cold distilled water.

In the case of water cooling Canadian Pat. No. 397,555 issued to Kenneth Cookson demonstrated efficient use of energy where the coolant water, after being heated by steam, serves as a hot water supply. U.S. Pat. No. 4,089,750 issued to Kirschman and Bolte also demonstrated efficient use of energy where coolant water is preheated before being admitted to the boiling chamber.

SUMMARY OF THE INVENTION

The water distiller invention disclosed herein incorporates both water-cooled and air-cooled features for steam condensation and aims at the objective of achieving maximum efficiency in energy use.

Steam condensation is carried out in a steam condensing chamber where water cooling is effected by the large area of cold surface exposed to the surrounding steam and air cooling is effected by the large cooling surface of the condenser vessel without using an electric fan that wastes energy. Distilled water is stored in the steam condensing chamber where it is kept hot by the incoming steam as it helps to condense more steam.

Another advantage of the invention is that a portion of the already cold distilled water may be left in the condensing chamber or cold distilled water may be re-admitted into the condensing chamber to aid with further steam condensation while itself is being heated up for hot serving. Since the distilled water may be served hot, this reduces further heating required should it be necessary to bring it to a boil, thus resulting in a saving of energy.

Yet another advantage of the invention is that hot distilled water removed from the condenser vessel and stored in separate containers undergoes natural cooling at room temperatures. Cooling surfaces exposed to air cooling are vastly increased. This cooling process is slow but requires no wastage of energy as opposed to fan cooling or wastage of water as opposed to water cooling where rapid cooling is required. Distilled water thus cooled and readmitted to the condensing chamber greatly improves the condensing efficiency since a portion of the demand for rapid heat loss is absorbed by the cold distilled water, thus taking advantage of the natural cooling effect.

Still yet another advantage of the invention is that in addition to steam condensation, water vapour emanating from the coolant water turned hot is also condensed and collected, thus adding to the overall efficiency of the distillation process.

A further advantage of the invention is that the hottest coolant water available is being supplied to the boiling chamber, thus reducing the heat required to bring the feed water to boiling point.

A still further advantage of the invention is that the hot coolant water may be used as a hot water supply for washing purposes.

A still further advantage of the invention is that the boiling chamber can be easily disconnected for cleaning and both boiling chamber and heating unit can be easily and cheaply replaced with new ones.

A still further advantage of the invention is that the operating temperature of the coolant water may be adjusted to suit summer and winter conditions. In summer the coolant operating temperature may be set low so that more heat is carried away to the sink in the form of hot water. In winter the coolant operating temperature may be set high so that more heat is lost to the surroundings to help in heating up the house. Hot water that is not needed and has to be disposed of is also reduced, thus minimising wastage of water supply.

A yet further advantage of the invention is that the assembly is composed of simple stacked on components that can be easily dismantled for servicing.

DETAILED DESCRIPTION

Figure 1:
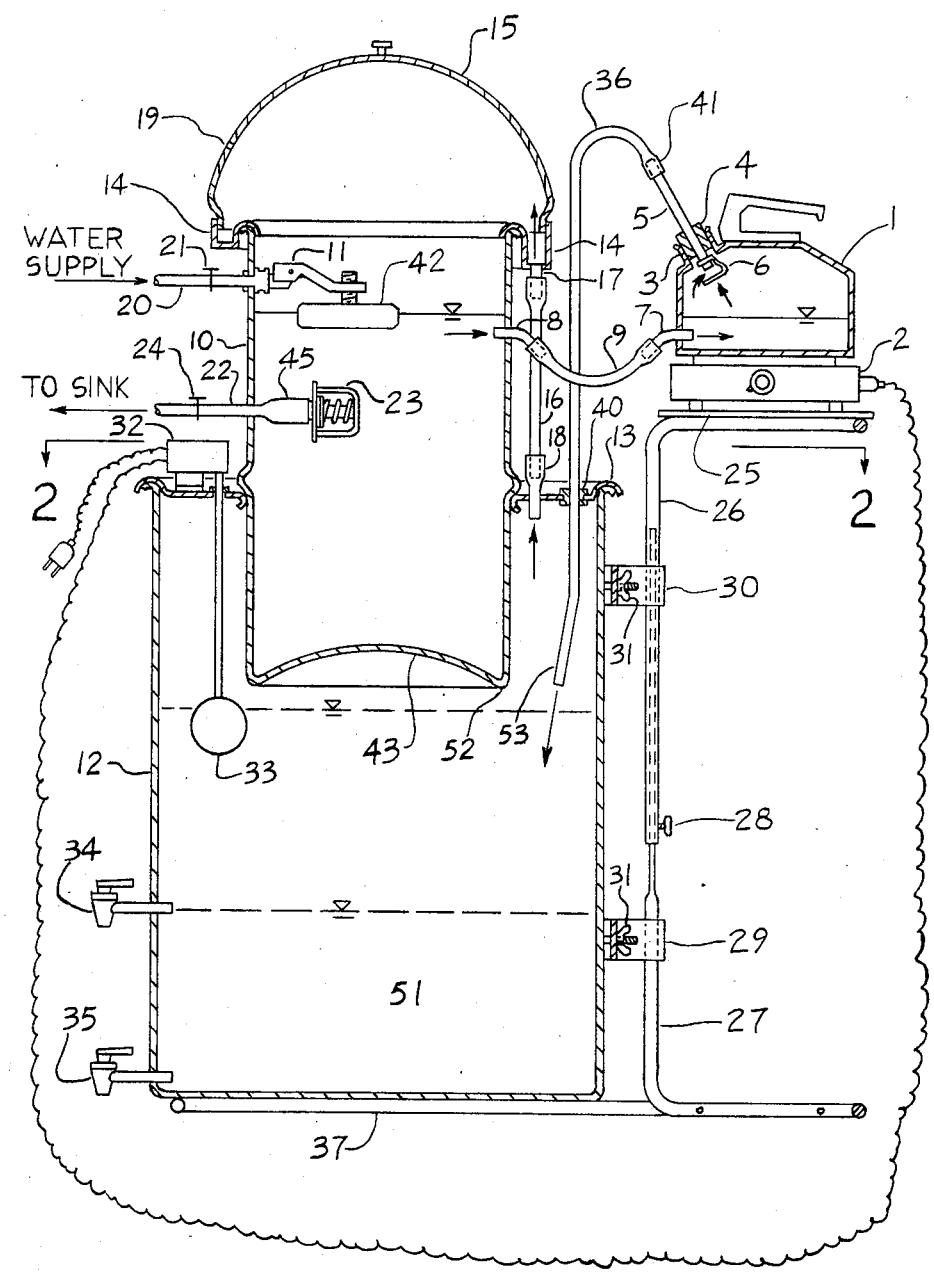
FIG. 1 is a vertical sectional view of the water distiller.
Figure 2:
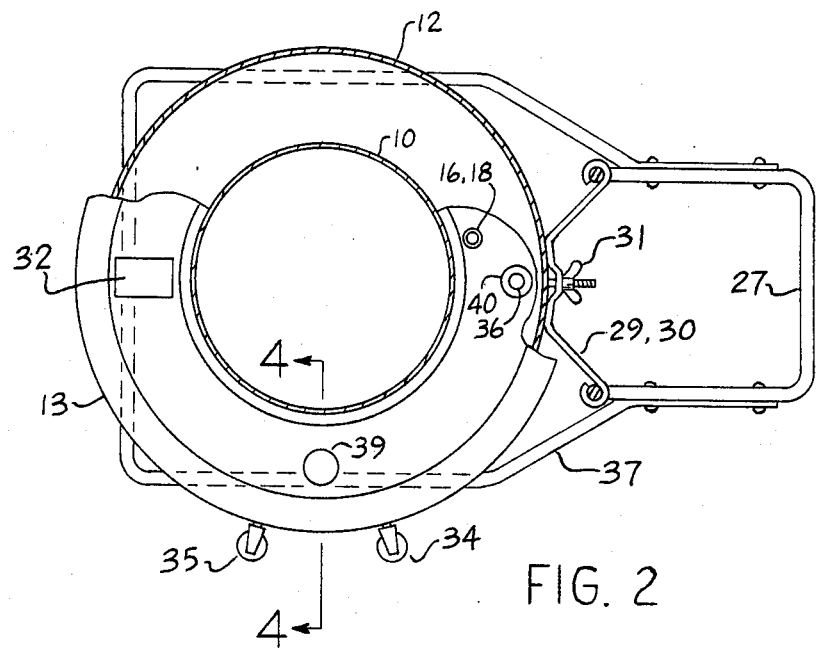
FIG. 2 is a horizontal sectional view of the water distiller taken along lines 2—2 of FIG. 1.
Figure 3:
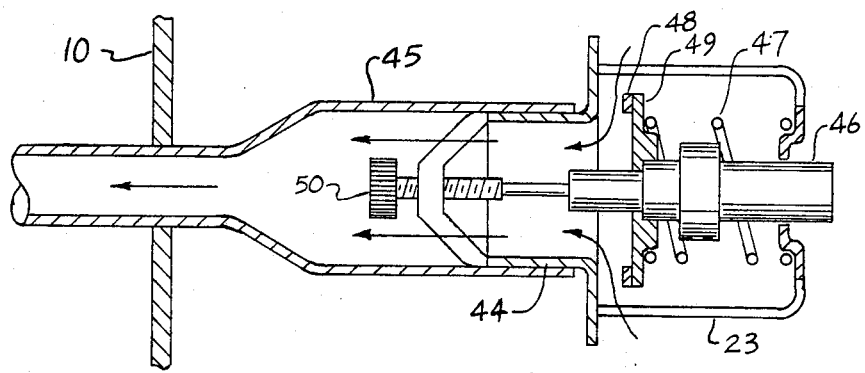
FIG. 3 is an enlarged sectional view of the thermostatic controlled water outlet.
Figure 4:
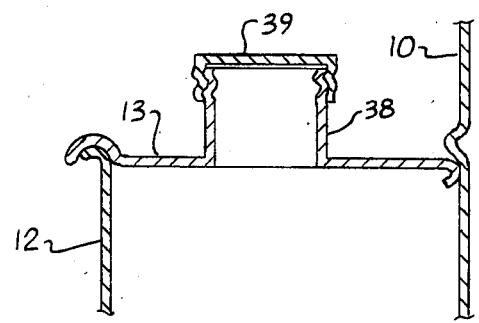
FIG. 4 is a vertical sectional view of the filler taken along lines 4—4 of FIG. 2.

The water distiller invention consists of a boiling chamber 1, heating element 2, and the condensing assembly. The boiling chamber 1, preferably a common kettle, has a cylindrical spout 3 such that the kettle or boiling chamber 1 can be made air tight when fitted with a rubber stopper 4. A hole drilled in the rubber stopper 4 through which a steam conduit 5 fits in permits steam to be directed away from the boiling chamber 1. A baffle 6 fitted at the end of the steam conduit 5 forms a shield preventing splashes from the boiling water from entering the steam exit. Steam exit is unobstructed and is freely emitted at the other end of the conduit 36 into a steam condensing chamber 51, so that steam is readily generated under atmospheric pressures. No pressure is built up in the boiling chamber 1 and the rubber stopper 4 will not pop out. Since steam is generated under atmospheric pressures, rather than under pressurized conditions, certain efficiency is realized. The steam conduit comprises two sections of metal tubings 5, 36 that are joined together by a detachable splice connection 41. The metal tubing 36 passes through a rubber seal 40 which is mounted in an opening in the condensing chamber cover 13 so that the metal tubing 36 can slide up and down the rubber seal 40. This movement together with the detachable splice connection 41 permits the boiling chamber 1 to be easily disconnected. On the side of the boiling chamber 1 close to the bottom is fitted a water inlet 7 such that this can be connected to a water outlet 8 on the cooling tank 10 via a flexible tubing 9. Through this conduit connection feed water is supplied from the cooling tank 10 to the boiling chamber 1 and water level inside the boiling chamber 1 is maintained at the same water level as the cooling tank 10 and water level is regulated by a float valve 11 that controls the incoming water supply to the cooling tank 10. Since hot water in the cooling tank 10 rises and stays at the top level, this arrangement permits preheated hot water to be fed to the boiling chamber 1, thus reducing the heating energy required to boil the water. The advantages of placing the float valve in the cooling tank 10 rather than in the boiling chamber 1 are that it is easier to install and at the same time permitting easier servicing of the float valve and the float 42 would work at a lower water temperature. This arrangement also permits the boiling chamber 1 to be easily serviced and cheaply replaced.

The condensing assembly comprises a condenser vessel 12, a condensing chamber cover 13, a cooling tank 10, a water collecting trough 14, a dome cover 15 and a vertical conduit 16. The condenser vessel 12, the condensing chamber cover 13 and the cooling tank 10 together form the steam condensing chamber 51 where steam is delivered and condensed and where the resulting distilled water is collected and stored. The condenser vessel 12 aside from forming the steam condensing chamber 51 also doubles its function as a distilled water storage tank. On top of the condenser vessel 12 is the condensing chamber cover 13 which has a large round hole at the centre through which the cooling tank 10 fits in and rests suspended on it with the lower portion of the cooling tank 10 immersed in the air space contained by the condenser vessel 12. At the top, along the periphery and all around on the outside of the cooling tank 10 is a trough 14 that fits snugly on the edge of the cooling tank 10 and with the bottom of the trough 14 sloping downwards from a high point on one side towards a low point on the other side where a spout 17 is located. This spout 17, leading downwards, mates with a tubing 16 which in turn mates with another tubing 18 fixed to the condensing chamber cover 13. These tubings connected thus form a conduit that serves to connect the air space in the condensing chamber 51 and the air space above the cooling tank 10. A dome shaped cover 15 rests on the outer periphery of the trough 14 so that condensed water from the dome cover 15 would drift into the trough 14. A hole 19 in the dome cover 15 serves as an air vent.

The cooling tank 10 is in the shape of a cylindrical metal container that is open on top and with a bottom 43 that concaves upward. Raw water or water from household water supply is fed into the cooling tank 10 through the supply line 20. A float valve 11 with float 42, fitted at the water inlet serves to regulate the incoming water so as to maintain a fixed water level. A tap 21 is provided so that water supply may be manually shut off. A water outlet 8 fixed to the side of the cooling tank 10 and located immediately below the water surface serves to supply feed water to the boiling chamber 1. A flexible tubing 9 that can be easily disconnected serves to connect this water outlet pipe 8 and the water inlet pipe 7 from the boiling chamber 1. Both water outlet pipe 8 and the water inlet pipe 7 are bent at an angle downwards so that when the flexible tubing 9 is connected it bows downwards, guaranteeing an uninterrupted water flow, of which the reverse would happen otherwise if the tubing bows upward and rising above the water level in the cooling tank 10. Another water outlet 22 is fitted to the cooling tank 10 and is located at a level below the outlet pipe 8 leading to the boiling chamber 1 and above the condensing chamber cover 13 on which the cooling tank 10 sits. This water outlet 22 is governed by a thermostat controlled valve 23 that opens when a predetermined temperature is exceeded. This water outlet 22, when opened, allows hot water to drain away to sink or to be used as hot water for washing purposes. A tap 24 is also provided so that rate of water flow may be manually adjusted.

The cylindrical portion 44 of the thermostat controlled valve 23 fits snugly into the enlarged portion 45 of the water outlet 22 so that a water-tight joint is formed. A heat sensor generally indicated at 46 serves to open the outlet valve when the temperature of the surrounding water reaches a preset value while a spring 47 closes the valve when the temperature is lowered. A ring seal 48 fixed to flange 49 serves to seal the valve when closed. This heat sensor 46 is the so-called thermal power device such as the one disclosed in U.S. Pat. No. 3,153,933 and is similar in construction to the thermostat commonly used in water-cooled motor car engines. The thermostat controlled valve 23 can be easily removed and taken out of the cooling tank 10. An adjustment screw 50 on the thermostat controlled valve 23 permits the temperature at which the valve opens to be manually varied. After setting the desired temperature the thermostat controlled valve 23 may be reinstalled. Alternatively, thermostat controlled valves 23 with different fixed temperature ratings may be used in turn as desired; in which case the adjustment screw 50 would not be needed.

The heating element 2 is preferably an electric range placed underneath the boiling chamber 1 so that each part may be separately replaced as required. The heating element 2 can also occur as an integral part of the boiling chamber 1 such as an electric kettle (not shown in the drawings) that is commonly available on the market. Use of a modern electric kettle has the further advantage that in the event of an interruption in feed water supply and the kettle boils dry, overheating would cause the receptacle to be ejected, cutting off electric power supply. Prevention of this remote mishap is thereby guaranteed. The boiling chamber 1 with electric range 2 or alternatively, the electric kettle, rests on top of a platform 25 supported by a pair of brackets 26, 27. This pair of brackets comprising an upper piece 26 and lower piece 27 is made of bent metal tubing such that the lower piece, with reduced tubing diameter, fits into the upper piece and togehter they form a pair of brackets with a vertical telescopic middle section. Locking screws 28 serve to fix the length of the brackets after the height of the platform 25, supported by the horizontal wing of the upper piece 26, is selected. The horizontal wing of the lower piece 27 provides stability and forms part of the support for the entire apparatus. The pair of brackets 26, 27 is fixed to the side of the condenser vessel 12 with bent-plate brackets 29, 30 and mechanical fasteners 31. The lower bent-plate bracket 29 is rigidly fixed to the bracket lower piece 27 while the upper bent-plate bracket 30 is free to slide along the vertical legs of the bracket upper piece 26. By adjusting the telescopic middle section of the brackets 26, 27 the water outlet 8 on the cooling tank 10 and the water inlet 7 on the boiling chamber 1 can be set at the same level. A bent metal tubing 37, well secured to the horizontal wing of the bracket lower piece 27, serves as a cooling rack as well as a support for the condenser vessel 12.

Electric power supply is controlled by a float switch 32 mounted on the condensing chamber cover 13. The float 33 is located inside the condensing chamber 51 such that when distilled water reaches a certain level, the float 33 would rise and switch off the electric power supply. When distilled water is drawn off through one of the taps 34, 35 the float 33 would fall causing the float switch 32 to automatically turn on the power supply.

Two taps, 34, 35 are fitted to the condenser vessel 12 for drawing off distilled water. The lower tap 35, called the hot water tap, is located at the bottom of the condenser vessel 12 while the upper tap 34, called the cold water tap, is located at a level approximately half way between the float 33 level and the bottom of the condenser vessel 12.

Steam generated in the boiling chamber 1 is directed upward via steam conduit 5 and then directed downward via conduit 36 that passes through the condensing chamber cover 123 and is blown generally downwards into the condensing chamber 51. Steam condensation is effected by four different modes as described in the following:

The first mode of steam condensation may be described as the 'sweat tank' principle. It is a well-known fact that water vapour condenses on the outer surface of a container that holds cold water. The cooling tank 10 is filled with cold water and the lower portion of the tank is immersed in steam. Steam condenses on the cold surfaces of the cooling tank 10 and the condensed water drips down and is collected at the bottom of the condenser vessel 12 which now doubles as a distilled water storage tank. The bottom 43 of the cooling tank 10 concaves upward so as to increase the surface area for heat transfer and at the same time facilitates water runoff so that more steam would come into contact with the cold surface. A dripping edge 52 is also formed along the bottom edge of the cooling tank 10 and this facilitates the dripping of water.

The second mode of steam condensation is effected by heat loss from the surfaces of the condensing chamber 51. Heat loss is effected by radiation and by conduction-convection process of adjacent air. The air adjacent to the hot surface of the condenser vessel 12 is heated up by conduction and rises, setting up a convection current along the vertical wall. This results in air cooling without the use of an electric fan. As heat is lost to the surrounding air, a corresponding amount of steam must condense on the inner surfaces of the condensing chamber 51. A bent metal tubing 37 well secured to the horizontal portion of the bracket lower piece 27 provides a support for the condenser vessel 12 and at the same time serves to expose the bottom of the condenser vessel 12 to air cooling. This mode of air cooling is made effective by the large surface area of the condenser vessel 12 that is exposed to the surroundings. Since the condenser vessel 12 serves as a distilled water storage tank, its size is necessarily large to serve its purpose and the resulting large surface area is conveniently utilized to facilitate heat loss to the surroundings.

The third mode of steam condensation is effected by the condensed water stored in the condensing chamber 51. Water dripping from the cooling tank 10 has temperatures lower than the boiling point. Heat loss from the surfaces of the condenser vessel 12 also helps to lower the temperature of the stored water. Steam blowing downwards hits the surface of the stored water where steam heats up the water that it comes into contact with while itself condenses into water. This process continues as long as water temperature is below boiling point. The steam jet blowing onto the water sets the water into a forced convection so that the colder water at the bottom is brought up to the top to help with more steam condensation. The end of the steam conduit 53 is bent slightly at an angle to the vertical so that the steam jet blowing out in the same direction would have a horizontal component that encourages forced convection within the body of the stored water. Two taps, 34, 35 are provided on the side of the condenser vessel 12. The lower tap 35 is the hot water tap and is to be used when the water is hot and when it is desirable to withdraw the entire content of the distilled water. The other tap located between the high distilled water level and the lower tap 35 is the cold water tap 34. If the distilled water is already cold at the time of draw-off, it is preferable to use the cold water tap. The purpose of this is to leave approximately half the cold distilled water in the vessel to help with further steam condensation. A cylindrical filler 38 with a screw-on cap 39 is fitted to the condensing chamber cover 13. After the cap 39 is removed, cold distilled water may be readmitted into the condensing chamber 51 to aid with further steam condensation. The cold distilled water is also heated up for hot serving. Hot distilled water removed from the condenser vessel 12 are stored in separate containers (not shown in the drawings) where they are left to cool naturally in air. The cooling process is slow but no effort is required. Surface area exposed to air cooling is also vastly increased. The cold distilled water readmitted into the condensing chamber 51 to mix with steam greatly reduce the rapid heat loss demand required for steam condenstion. Thus the slow but effortless natural cooling is utilized in an effective way to increase the efficiency of steam condensation.

The fourth mode of steam and vapour condensation is effected by heat loss from the dome cover 15 surface. Uncondensed steam from the steam condensing chamber 51 passes up the vertical conduit 16 into the air space under the dome cover 15. Water condenses on the inner lining of the dome cover 15 and drips down into the trough 14 where water drains into the spout 17 and back into the condensing chamber 51 as distilled water via the conduit 16. Cold water in the cooling tank 10 is being heated up in the lower section by steam and rises to the top. Since water is a poor conductor of heat, the water at the surface becomes very hot while the cold water sinks and remains very cold at the bottom. When the surface water becomes hot enough, water vapour emanates from the water surface and is condensed on the dome cover 15 together with the steam coming from the condensing chamber 51. Thus, extra distilled water is obtained without direct heating of raw water and this adds to the overall efficiency of the distillation process.

The thermostat controlled water outlet valve 23 is located on the side of the cooling tank 10 at an elevation below the water supply line 8 to the boiling chamber 1. When coolant water temperature at the thermostat controlled valve 23 level reaches a pre-set temperature, the valve automatically opens allowing hot water to drain out either for use as hot water or simply run off to sink. This causes water level in the cooling tank 10 to be lowered and more cold water from water supply 20 is admitted through the float valve 11. The admitted cold water immediately sinks to the bottom. The temperature setting of the valve 23 may be varied by the adjustment screw 50, or alternatively, by using thermostat valves 23 with different fixed temperature ratings, so that the amount of steam condensed by the cooling tank 10 may be controlled to a certain extent. In winter it may be desirable to set the temperature higher so that the cooling tank 10 runs hotter and more cooling is effected by air cooling resulting in a greater heat loss to the surroundings. This means that the heat after doing the work of distilling water is utilized to heat up the house. In summer when heating up the house is undesirable, the temperature setting may be lowered so that hot water is released at a lower temperature causing more cold water to be admitted to the cooling tank 10 and heat is carried away to sink in the form of hot water.

The materials used for making the vessels, covers, boiling chamber and metal conduits are preferably those commonly used for making kitchen utensils.

In operation, when distilled water stored in the condenser vessel 12 is removed for use through one of the taps 34, 35, the distilled water level drops creating a demand for more distilled water. The float switch 32 automatically turns on the electric power supply and steam is generated in the boiling chamber 1. Steam is delivered to the condensing chamber 51 and is condensed therein. As water boils away in the boiling chamber 1, feed water is continuously supplied from the cooling tank 10 to the boiling chamber 1. The float valve 11 allows cold water supply to be admitted to maintain water level. The admitted cold water sinks immediately to the bottom of the cooling tank 10 where heat transfer takes place. Hot water in the cooling tank 10 rises and when the coolant water is hot enough the thermostat controlled valve 23 opens allowing hot water to drain away so that more cold water supply is admitted through the float valve 11. The thermostat controlled valve 23 automatically close when the coolant water becomes cold again. When enough distilled water is collected the float switch 32 would automatically switch off the power supply, shutting down the entire operation. The distillation process is thus made fully automatic, continuous and self-limiting by the use of two simple float controls and a thermostatic water outlet valve.

I claim:

1. A water distiller assembly comprising:
   a boiling chamber comprising a vessel having heating means operatively associated therewith for heating supply water in said vessel;
   a steam conduit means for delivering a steam generated in said boiling chamber to a condensing chamber where steam is condensed;
   a condenser vessel that is open at the top, a condensing chamber cover which fits onto said condenser vessel and a cooling tank;
   said condensing chamber cover has a large round opening at the center for accepting and supporting said cooling tank;
   said cooling tank comprising a cylindrical vessel that is open at the top and is smaller in size than said condenser vessel so that it may be fitted into said condensing chamber cover and be supported on said cover;
   said condensing chamber comprises said condenser vessel, said condensing chamber cover and the lower portion of said cooling tank;
   a trough means that hangs from the top rim of said cooling tank and on the outside of said cooling tank;
   a vertical conduit means connecting said trough means at its lowest level to said condensing chamber and forming a spout of said trough means;
   a dome cover means that rests on the outer wall of said trough means;
   said boiling chamber comprising a cylindrical spout to which a rubber stopper is fitted to form an air tight chamber;
   said steam conduit means passing through said rubber stopper serves to deliver steam from said boiling chamber to said condensing chamber;
   a baffle means attached to the end of said steam conduit means inside said boiling chamber serves to prevent splashes from boiling water from entering said steam conduit means;
   a detachable splice connection, between said boiling chamber and said condensing chamber cover, along said steam conduit means to permit easy disconnection of said boiling chamber from said condensing chamber;
   a rubber sealing means mounted on said condensing chamber cover and through which said steam conduit means passes so that said steam conduit means can slide up and down said rubber sealing means to permit easy disconnection of said boiling chamber from said condensing chamber.

2. The combination as defined in claim 1 wherein:
   said boiling chamber is an electric kettle with an over-heating prevention device combined therewith so that if said electric kettle boils dry, the electric supply would be cut off.

3. The combination as defined in claim 1 wherein:
   said boiling chamber is a plain kettle and said heating means is an electric range so that in operation said plain kettle rests on top of said electric range.

4. The combination as defined in claim 1 wherein:
   said cooling tank containing water as coolant for condensing steam also serves as a feed water tank for said boiling chamber to maintain the supply of the hottest water available to said boiling chamber and which is connected to said boiling chamber by a water conduit with both ends located below and close to the water surface so that the water level in said cooling tank is the same as the water level in said boiling chamber and so that only water close to the water surface in said cooling tank is supplied to said boiling chamber, and the water level in said cooling tank is maintained by an inlet of cold water supply to said cooling tank, said inlet of cold water supply being operatively associated with a float valve mechanism located therein for regulating the supply of cold water to said cooling tank to maintain said water level.

5. The combination as defined in claim 4 wherein:
   said water conduit comprises two sections of metal tubings and one section of flexible tubing, with one end of one section of said metal tubing fixed to said cooling tank and the corresponding end of the other said metal tubing fixed to said boiling chamber, and with the other ends of both said metal tubings bent downward at an angle so that said flexible tubing bows downward when connected to the bent down ends of said metal tubings; said flexible tubing is connected to said metal tubings by tubing connection means that can be easily disengaged to permit easy disconnection of said boiling chamber from said condensing chamber.

6. The combination as defined in claim 1 wherein:
   said cooling tank is supported by said condensing chamber cover with the lower portion of said cooling tank suspended inside said condenser vessel.

7. The combination as defined in claim 6 wherein:
said cooling tank comprises a bottom that concaves upward and a water dripping edge that is formed at the junction of the bottom surface and the side wall of said cooling tank.

8. The combination as defined in claim 1 wherein:
said steam conduit means comprises a steam delivery end located inside said condensing chamber so that steam is delivered to said condensing chamber and steam condensation generally takes place within the confinement of said condensing chamber and distilled water is collected and stored in said condensing chamber so that said condenser vessel in addition to forming said condensing chamber also doubles its function as a distilled water storage tank.

9. The combination as defined in claim 8 wherein:
said steam delivery end points generally downwards so that steam delivered to said condensing chamber is emitted in the form of a steam jet directed generally downwards and blown onto the surface of the distilled water that is collected and stored in said condenser vessel.

10. The combination as defined in claim 1 or 8 wherein:
said condenser vessel and said condensing chamber cover of said condensing chamber are exposed to the surroundings so that partial steam condensation occurring within said condensing chamber is effected through cooling by heat loss to the surroundings and is made effective by utilizing the large overall surface exposure of said condensing chamber to the surroundings.

11. The combination as defined in claim 1 further comprising:
a hot water tap, located at the bottom of said condenser vessel for serving to empty said condenser vessel of the stored water; and a cold water tap, located about half way between said hot water tap and the maximum water storage level, for permitting partial withdrawal of the stored water, said cold water tap is there solely for the purpose of retaining cold distilled water to facilitate further steam condensation.

12. The combination as defined in claim 1 further comprising:
a filler means comprising a filler neck and a filler cover incorporated in said condensing chamber cover and is there for the purpose of readmitting cold distilled water into said condensing chamber to facilitate steam condensation and to heat up the readmitted cold distilled water with steam.

13. The combination as defined in claim 1 wherein:
the air space contained by said condensing chamber and the air space contained by said dome cover, said cooling tank and said trough means are interconnected by said vertical conduit so that steam would pass up through said vertical conduit into the air space under said dome cover while condensed water would drain down through said vertical conduit into said condensing chamber.

14. The combination as defined in claim 13 wherein:
said vertical conduit means comprises a top portion which is integral with and forming a spout of said trough means, a middle portion having an enlarged top end, and a bottom portion having an enlarged top end and with lower end integral with said condensing chamber cover so that in operation said middle portion would mate with said top portion and said bottom portion to form said vertical conduit means that allows water to drain down said vertical conduit means without spilling and so that said middle portion is easily removable by lifting up said top portion.

15. The combination as defined in claim 1 wherein :
said dome cover means rests on top of said cooling tank and said trough means so that said dome cover means confines steam passing up said vertical conduit means from said condensing chamber and water vapour emanating from the hot water of said cooling tank so that steam and water vapour condense on the inside surface of said dome cover means through heat loss from said dome cover means to the surroundings and so that condensed water would drift down to the bottom of said dome cover means.

16. The combination as defined in claim 1 or 14 wherein:
said trough means hangs on the outside along the top of said cooling tank; said trough means receives said dome cover means so that water condensed on said dome cover means would drain into said trough means; the bottom of said trough means slopes generally from a high point on one side to a low point on the opposite side where said spout is located at the bottom so that water collected in said trough means would flow to said spout and down said vertical conduit means into said condensing chamber.

17. The combination as defined in claim 1 or 4 or 6 further comprising:
a water drain outlet means located on said cooling tank at a level between the support level of said cooling tank and said water conduit supplying feed water to said boiling chamber and is operatively associated with a manually controlled tap so that the rate of hot water flowing to drain may be regulated.

18. The combination as defined in claim 17 further comprising:
a thermostat controlled valve operatively associated with said water drain outlet means so that when the water temperature at the level of said water drain outlet means exceeds a preset limit, said thermostat controlled valve opens to allow the outflow of water.

19. The combination as defined in claim 18 further comprising:
an adjustment means operatively associated with said thermostat controlled valve so that the temperature at which said thermostat controlled valve would open to permit the outflow of water may be varied, thereby increasing or decreasing the operating temperature of the coolant water in said cooling tank.

20. The combination as defined in claim 1 or 2 or 3 further comprising:
a float switch means operatively associated with said heating means and mounted on said condensing chamber cover with its float inside said condensing chamber so that when the distilled water stored in said condenser vessel reaches a certain level, said float would rise and would activate the cut-off of electric power supply to said heating means and when the water level is low said float would drop, causing said float switch to resume electric power supply to said heating means.

21. The combination as defined in claim 1 further comprising:
a pair of brackets comprising a vertical telescopic middle section, a horizontal top section and a bottom section such that said bottom section forms part of the support for the entire assembly and said vertical telescopic middle section, being telescopic, can have different selected lengths locked in place with locking screws associated therewith so that said top section, having a platform that supports said boiling chamber and said heating means, can be raised or lowered to provide a proper elevation for said boiling chamber.

22. The combination as defined in claim 21 further comprising :
a top bent plate brackets means and a bottom bent plate bracket means for securing said pair of brackets to said condenser vessel with mechanical fasteners and with said top bent plate bracket means free to slide along the vertical legs of said pair of brackets to accommodate different heights of said platform.

23. The combination as defined in claim 21 wherein:
said condenser vessel rests on a horizontal bent tubing means that is secured to said bottom section of said pair of brackets so that the bottom surface of said condenser vessel is exposed to air cooling.

24. The combination as defined in claim 9 wherein:
said steam conduit means serving to deliver said steam jet downwards inside said condensing chamber is slightly bent at an angle to the vertical at said steam delivery end so that said steam jet hitting the surface of the stored distilled water has a horizontal component that encourages forced convection within the body of the stored distilled water.

25. The combination as defined in claim 1 or 14 wherein:
said dome cover means, said cooling tank, said condensing chamber cover, said condenser vessel and said vertical conduit means are structurally associated with each other by being removably stacked together and held together by the weight of the units thereby being easily disassembled to permit access to the interior of said vessels.

* * * * *